(12) United States Patent
Giorgi

(10) Patent No.: US 9,639,098 B2
(45) Date of Patent: May 2, 2017

(54) THERMOSTAT AND MESSAGING DEVICE AND METHODS THEREOF

(71) Applicant: Magnum Energy Solutions, LLC, Hudson, OH (US)

(72) Inventor: Michael E. Giorgi, Hudson, OH (US)

(73) Assignee: MAGNUM ENERGY SOLUTIONS, LLC, Hudson, OH (US)

( * ) Notice: Subject to any disclaimer, the term of this patent is extended or adjusted under 35 U.S.C. 154(b) by 0 days.

(21) Appl. No.: 14/740,800

(22) Filed: Jun. 16, 2015

(65) Prior Publication Data

US 2015/0362927 A1 Dec. 17, 2015

Related U.S. Application Data

(60) Provisional application No. 62/013,039, filed on Jun. 17, 2014.

(51) Int. Cl.
*G05D 23/19* (2006.01)
*H04L 12/28* (2006.01)
*F24F 11/00* (2006.01)

(52) U.S. Cl.
CPC ....... *G05D 23/1905* (2013.01); *H04L 12/282* (2013.01); *H04L 12/2818* (2013.01); *F24F 2011/0063* (2013.01); *F24F 2011/0071* (2013.01); *F24F 2011/0091* (2013.01); *G05B 2219/2614* (2013.01); *G05B 2219/2642* (2013.01); *H04L 2012/285* (2013.01)

(58) Field of Classification Search
CPC ........ F24F 11/00; F24F 11/02; F24F 11/0009; F24F 11/0086; F24F 2011/0063; F24F 2011/0068; F24F 2011/0071; F24F 2011/0091; G05B 15/02; G05B 19/042; G05B 2219/2614; G05B 2219/2642; H04W 4/02
See application file for complete search history.

(56) References Cited

U.S. PATENT DOCUMENTS

| | | | |
|---|---|---|---|
| 5,361,982 A | 11/1994 | Liebl et al. | |
| 7,548,130 B2 * | 6/2009 | Kobayashi | G01S 19/235 331/1 A |
| 8,556,188 B2 * | 10/2013 | Steinberg | F24F 11/0034 165/237 |
| 8,620,841 B1 * | 12/2013 | Filson | H04L 12/1895 706/12 |

(Continued)

OTHER PUBLICATIONS

International Search Report and Written Opinion received for International Application No. PCT/US2015/036185, mailed Sep. 8, 2015, 11 pages.

*Primary Examiner* — Crystal J Barnes-Bullock
(74) *Attorney, Agent, or Firm* — Amin, Turocy & Watson, LLP

(57) ABSTRACT

Thermostat and messaging devices (TMDs) and associated platforms for providing monitor and control functionality are disclosed. A TMD can be in communication with one or more sensors to facilitate intelligent heating and cooling as well has home automation. The TMD can facilitate communication with a plurality of different networking protocols such that it can receive communication signals from a plurality of different sensors and devices that operate using varying communication techniques. The TMD can also be configured to assist with geolocating a person who is calling for emergency services.

6 Claims, 11 Drawing Sheets

(56) References Cited

U.S. PATENT DOCUMENTS

| | | | |
|---|---|---|---|
| 8,840,033 B2* | 9/2014 | Steinberg | F24F 11/0034 165/237 |
| 9,134,710 B2* | 9/2015 | Cheung | F24F 11/006 |
| 9,305,140 B2* | 4/2016 | Federoff | G06F 19/322 |
| 2003/0066897 A1 | 4/2003 | Carner et al. | |
| 2013/0186964 A1 | 7/2013 | Simon et al. | |
| 2014/0031991 A1* | 1/2014 | Bergman | G05D 23/19 700/276 |
| 2014/0316586 A1* | 10/2014 | Boesveld | H04Q 9/00 700/278 |
| 2015/0022355 A1* | 1/2015 | Pham | G08B 17/06 340/541 |
| 2015/0168003 A1* | 6/2015 | Stefanski | F24F 11/0034 165/237 |
| 2015/0327010 A1* | 11/2015 | Gottschalk | G06F 17/50 455/456.1 |
| 2015/0349972 A1* | 12/2015 | Deivasigamani | G05B 15/02 700/275 |
| 2016/0131382 A1* | 5/2016 | Rosen | F24F 11/006 700/278 |

* cited by examiner

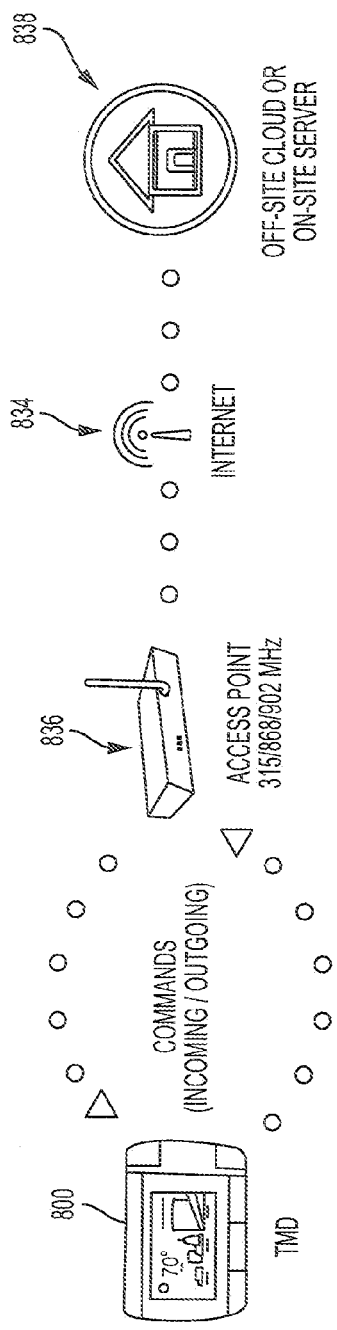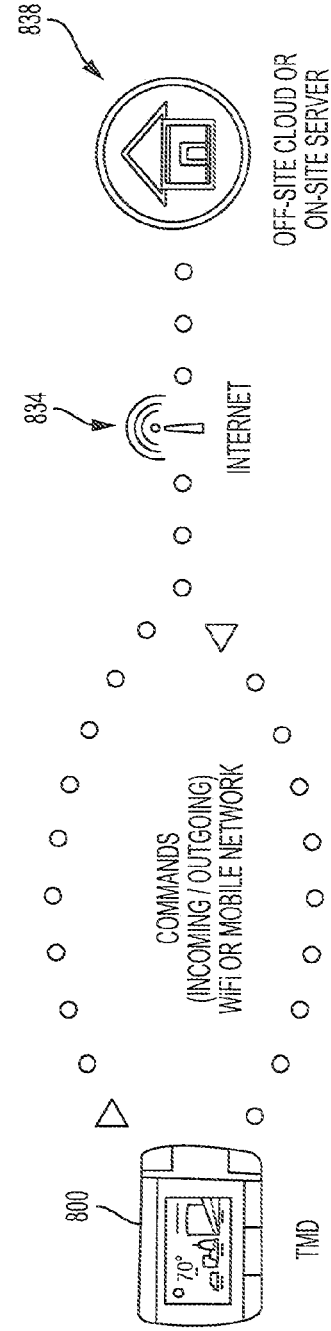

THERMOSTAT AND MESSAGING DEVICE AND METHODS THEREOF

CROSS-REFERENCE TO RELATED APPLICATION

This application claims the benefit of U.S. provisional patent application Ser. No. 62/013,039, filed on Jun. 17, 2014, entitled, THERMOSTAT AND MESSAGING DEVICE AND METHODS THEREOF, the disclosure of which is hereby incorporated by reference in its entirety.

BACKGROUND

Example home automation systems can enable control of lighting, heating and air conditioning, window shades or curtains, audio/visual equipment, and other appliances. Home automation systems can include relatively simple systems that control one or a few functions in a home to more elaborate systems that control multiple, disparate features. The home automation market has been fractured because most of the automation control manufacturers address narrow, vertical market segments, and use proprietary interfaces to protect their market. For example, some leading control manufacturers offer systems that focus on heating, ventilation, and air conditioning (HVAC) systems control. These manufacturers have little interest in controlling lighting, security systems, entertainment systems, and the like. Other manufacturers make, for example, home entertainment controllers that integrate various video and audio components, but the primary focus has been to offer integrated control over only their own components. As a result, consumers face an array of control systems that do not interoperate, and that may have proprietary interfaces that are difficult to understand and program or otherwise require a consumer to utilize many different gateways to implement the desired automation functionality.

BRIEF DESCRIPTION OF THE DRAWINGS

It is believed that certain embodiments will be better understood from the following description taken in conjunction with the accompanying drawings, in which like references indicate similar elements and in which:

FIGS. 8A-8B depict example network communication diagrams according to various implementations.

DETAILED DESCRIPTION

Figure 1:
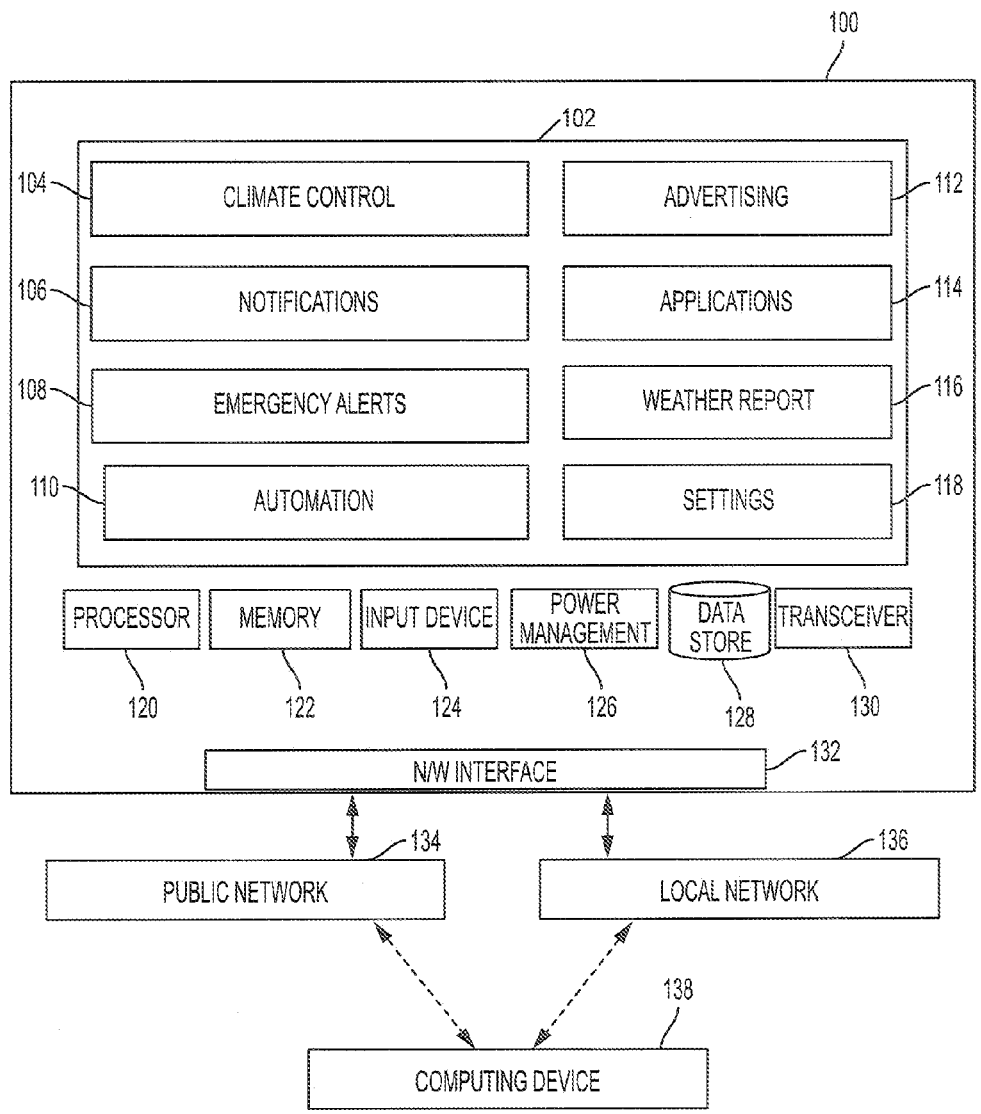
FIG. 1 is a simplified example block diagram in accordance with one non-limiting embodiment.

Various non-limiting embodiments of the present disclosure will now be described to provide an overall understanding of the principles of the structure, function, and use of systems, apparatuses, devices, and methods disclosed. One or more examples of these non-limiting embodiments are illustrated in the selected examples disclosed and described in detail with reference made to FIGS. 1-11 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software"

is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems, and can use other protocols, or operate at other layers in communication protocol stacks, than are described.

The systems, apparatuses, devices, and methods disclosed herein generally relate to an intelligent control and messaging device, referred to herein as a thermostat and messaging device ("TMD"), and associated platform for providing monitor and control functionality. The TMD can be in communication with one or more sensors to facilitate intelligent heating and cooling. Example sensors, as described in more detail below, can include window sensors, light sensors, and occupancy sensors. The TMD can facilitate communication utilizing a plurality of different networking protocols such that it can receive communication signals from a plurality of different sensors, control elements, and/or other devices that operate using varying communication techniques. The platform can also include a variety of wireless control elements, such as lighting control elements, home automation elements, smart outlets, and other types of batteryless wireless switches. The TMD can also be configured to assist with geolocating a person who is calling for emergency services, as described in more detail below.

Generally, the systems, apparatuses, devices, and methods disclosed herein can provide for monitoring and controlling environmental characteristics of a building with the ability to wirelessly receive visual notifications and audible alarms. The TMD can include a warning/communication device having a transceiver that can broadcast audible alarms or messages. The TMD can also display text-based, visual, and/or graphical alerts as well as informational messages and video messages. In some embodiments, audio and/or visual advertisements can be provided by the TMD.

In accordance with various embodiments, a TMD can be integrated into a larger system that can include wireless and battery-free sensors and switches and various types of controllable elements. A TMD can include a visual display, such as an LCD screen, to provide a user interface for displaying and receiving information, notifications and alerts to and from a user. Additionally, a TMD can include audible and visual alarm functionality for communicating security related concerns to the user. Data can be communicated to a TMD through a variety of communication techniques, such as a LAN access point over a radio frequency (RF). Additionally or alternatively, a TMD can utilize other types of network interface for communicating over various communication protocols, such as Wi-Fi™, Bluetooth™, and/or cellular (i.e., 3G and 4G, and so forth). In some embodiments, a TMD can also receive signals using one more protocols associated with wireless personal area networks, near field communication, and the like, such as a ZIGBEE protocol, a BLUETOOTH protocol, a ENOCEAN protocol, and so forth.

TMDs in accordance with the present disclosure can include conventional thermostat functions as well as provide additional functionality or services. For example, notification and alarms can be received and communicated to a resident, occupant, facility manager, or other type of user. In some embodiments, a TMD can function as a central command hub for an occupied environment. Through interactions with the TMD, climate can be controlled, lights and other devices can be controlled, and streaming media can be controlled. Additionally, the TMD can communication with various devices and appliances within the space. The TMD can provide a scheduling function, as well energy monitoring functionality.

TMDs can be utilized in a variety of environments, including rooms within buildings, including residential, commercial offices, multi-family residential, hotel rooms, schools, university dorms, and so forth. Messages provided to the TMD for delivery to a user can be of any nature, including, but not limited to, egress instructions, safety concerns, suspicious package notification, suspicious person notification, and so forth. Advertising can also be displayed on the graphical interface. In some embodiments, the advertising is automated through internet-based tools.

Merely for the purposes of illustration, below are non-limiting TMD operational examples. In a first operational example, a TMD is installed in each room of a university dormitory. The TMD can graphically and/or audibly notify students of safety concerns on campus. The TMD can provide instructions for emergency evacuations. In some embodiments, a TMD can allow the students to respond to an emergency notification via interactions with the TMD. For example, a notification requesting the number of people in the dorm room can be dispatched to the TMD and an occupant can reply to the message with the requested information.

In another operational example, a plurality of TMDs can be used in a multi-unit dwelling structure. Residents in multi-unit dwelling structures can receive information through their TMD from the front desk staff, or other central command center. Example information that can be provided by the TMD include notification of visitors, package arrival, and rent due dates.

In another operational example, a TMD can be deployed in rooms of an educational venue, such as class rooms. Administration, faculty and students can then have the ability to be immediately notified through the TMD of security threats at the school, as well as other events, such as weather emergencies. The notifications can include graphical alerts and audible alerts. The notifications can provide instructions on how to react in order to protect students and faculty.

FIG. 1 depicts a simplified example block diagram of an example TMD 100. The TMD 100 is in communication with various networks, shown as a public network 134 and a local network 136. The local network 136 can be, for example, a WiFi based network and can also include a variety of other control devices, as described in more detail below. The public network 136 can be, for example, the Internet. Through one or more of the networks 134, 136 the TMD 100 can be in communication with a computing device 138. The computing device 138 can be any type of device and associated with any number of users. For example, the computing device 138 can be a smart phone or a tablet computer that is used to configure various settings of, or otherwise communicate with, the TMD 100. The computing device 138 can also be a server associated with a weather resource center or a media streaming entity. In some embodiments, the computing device is a home automation device to facilitate the operation of various elements (lights, blinds, fans, etc.) within an environment through the TMD 100.

The TMD 100 can be provided using any suitable processor-based device or system, and can include one or more processors and one or more memory units. For convenience, only one processor 120 and only one memory unit 122 are shown in FIG. 1. The processor 120 can execute software instructions stored on the memory unit 122. The processor 120 can be implemented as an integrated circuit (IC) having one or multiple cores. The memory unit 122 can include volatile and/or non-volatile memory units. Volatile memory units can include random access memory (RAM), for example. Non-volatile memory units can include read-only memory (ROM) as well as mechanical non-volatile memory systems, such as a hard disk drive, optical disk drive, or other non-volatile memory. The RAM and/or ROM memory units can be implemented as discrete memory ICs.

The memory unit 122 can store executable software and data. When the processor 120 of the TMD 100 executes the software instructions, the processor 120 can be caused to perform the various operations of the TMD 100. The various operations of the TMD 100 can include communicating with the networks 134, 136, communication with control devices, receiving notifications/messages, communicating with various data providers, including weather providers, social media providers, and security providers, providing home automation operations, displaying advertisements, among other functionalities, as described in more detail below.

The TMD 100 can utilize various operating systems. In one embodiment, the TMD 100 utilizes an Android-based operating system. In other embodiments, the TMD 100 can utilize a Windows-based operating system, a Linux operating system, an iOS from Apple Computer Corp., a smart phone operating system or other appropriate operating system. The TMD 100 can also store and access data in a data store 128. The data stored in the data store 128 can be stored in a non-volatile computer memory, such as a hard disk drive, solid state drive, read only memory (e.g. a ROM IC), or other types of non-volatile memory.

Also shown in FIG. 1, the TMD 100 can include an input device 124 for allowing a user to provide inputs. The input device 124 can include, for example, a touch sensitive screen, a key pad, a stylus, voice input, gesture input, or any other number of suitable options. The TMD 100 can also include power management module 126 for regulating power from a suitable power source. The power management module 126 can also include a battery back-up for permitting at least some functionality in the event of a power loss. For example, in the event of power loss, the power management module 126 can deactivate all the processes of the TMD 100 except for cellular connectivity. In some embodiments, the TMD 100 includes a transceiver 130 for providing audible messaging, such as instructional messages, tones, and the like.

The TMD 100 can include one or more graphical display screens 102 for providing information. Non-limiting example functionalities provided by the graphical display screen 102 are shown in FIG. 1. As illustrated, example functionalities can include climate control 104, notifications 106, emergency alerts 108, automation 110, advertising 112, applications 114, weather reports 116, and setting management 118.

The TMD 100 can be in communication with a variety of sensors, switches, and other controllable devices through the network interface 132. In some embodiments, one or more of the controllable devices communicate with the TMD 100 through one or both of the networks 134, 136. The networks 134, 136 can be electronic communications networks and can include, but are not limited to, the Internet, LANs, WANs, GPRS networks, other networks, or combinations thereof. The networks 134, 136 can include wired, wireless, fiber optic, other connections, or combinations thereof. In general, the networks 134, 136 can be any combination of connections and protocols that will support communications with the TMD 100 and on-site and/or off-site networked devices.

Figure 2:
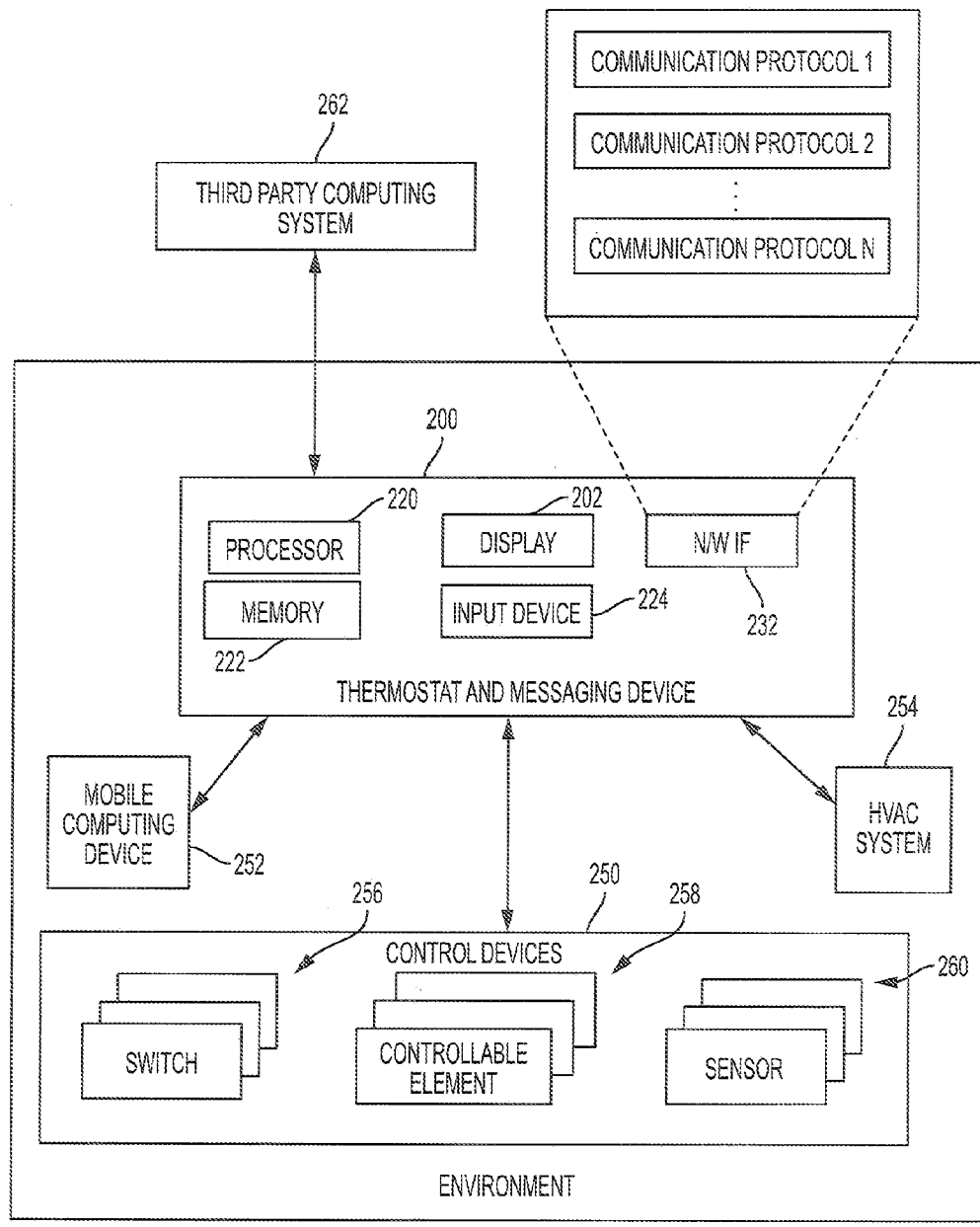
FIG. 2 is simplified example block diagram in accordance with another non-limiting embodiment.

FIG. 2 depicts an example system diagram depicting a TMD 200 positioned within an environment. The TMD 200 can include components similar to those of the TMD 100 illustrated in FIG. 1, such as a processor 220, a memory 222, a display 202, an input device 224, and a network interface 232. The TMD 200 can be in communication with one or more third party computing systems 262 through networked connections. For simplicity, only one third party computing system 262 is illustrated in FIG. 2. The third party computing system 262 can provide various content, data and/or messaging to the TMD 200, such as social media content, telephony services, streaming services, home automation services, and so forth. The TMD 200 can also communicate wirelessly to a variety of devices and elements within the environment, generally illustrated as control device 250. Example control devices 250 can include, without limitation, switches 256, controllable elements 258, and sensors 260. For example, switches 256 can be tied to various lighting devices within the environment. Controllable elements 258 can include, for example, appliances, surveillance equipment, electrical outlets, home theater equipment, window blinds, and the like. Sensors 260 can include any number of sensor types, such as occupancy sensors, lighting sensors, smoke detectors, and so forth. Due to the multi-protocol communication functionality of the TMD 200, each of various control devices 250 can communicate with the TMD 200 in any of a variety of disparate communication protocols. As shown in FIG. 2, the network interface 232 can include a plurality of transceivers to facilitate communication via communication protocols 1-N.

The TMD 200 can also communicate with an HVAC system 254 associated with the environment. Control commands can be delivered to the HVAC system 254 based on inputs from a user interfacing with the TMD 200, based on a pre-determined schedule, and/or based on environmental conditions as determined based on data provided by the sensors 260. The TMD 200 can also communicate with one or more computing devices of an occupant, shown as mobile computing device 252.

Figure 3:
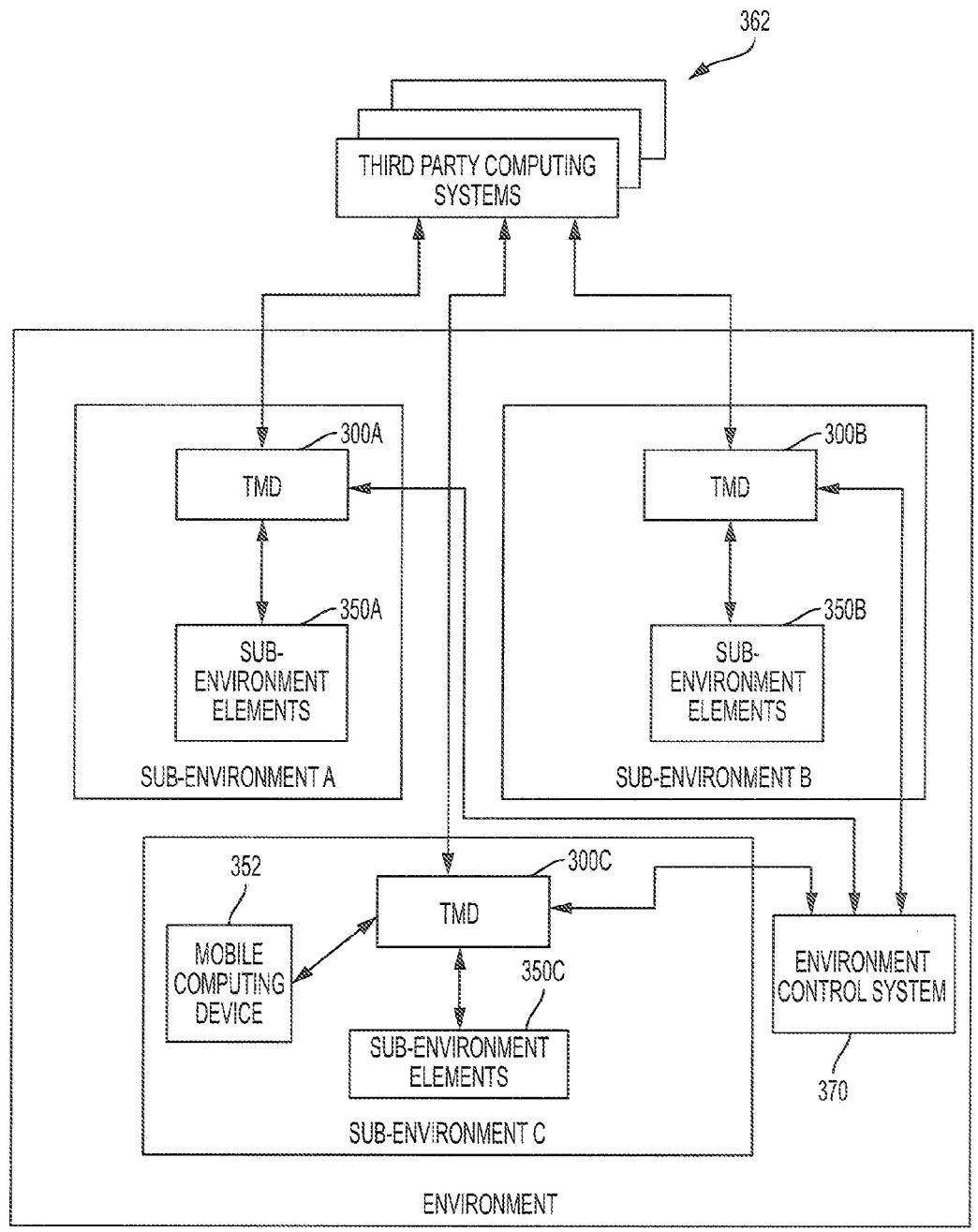
FIG. 3 is simplified example block diagram in accordance with yet another non-limiting embodiment.

FIG. 3 depicts a system diagram of a plurality of TMDs deployed in an environment. The environment can have a plurality of environments, shown as sub-environments A, B, C. The sub-environments can be, without limitation, hotel rooms, apartments/condominiums, dormitory rooms, offices, and so forth. A TMD 300A is associated with sub-environment A, a TMD 300B is associated with sub-environment B, and a TMD 300C is associated with sub-environment C. Each TMD 300A-C can be in communication with various sub-environment elements 350A-C. Example sub-environment elements 350A-C can include switches, appliances, outlets, media equipment, lights, and the like. Each of the TMDs 300A-C can also communicate with various third party computing systems 362 to provide various services to the occupants of the sub-environments, such as weather related information, social media content and other types of messaging. The TMDs 300A-C can also communicate with various local computing devices, such as a mobile computing device 352.

Each of the TMDs 300A-C can also communicate, either wirelessly or through wired communications, to an environment control system 370. The environment control system 370 can be used to dispatch messaging, notifications, or other content to individual TMDs 300A-C or to specific TMDs 300A-C. By way of example, emergency information can be broadcasted to each TMD 300A-C. In some embodiments, the TMDs 300A-C can request user input that can be provided to the environment control system 370, or elsewhere. For example, the request may ask an occupant to input the total number of people in the sub-environment. Alternatively, the request may ask the occupant to provide other information. Other content can be broadcasted for display on the TMDs 300A-C, such as notifications, advertisements, and other alerts. The environment control system 370 can also be utilized to send discrete messages to particular TMDs 300A-C. The discrete message can inform an occupant of the sub-environment of user-specific information, such as the arrival of a package or a visitor.

Figure 4:
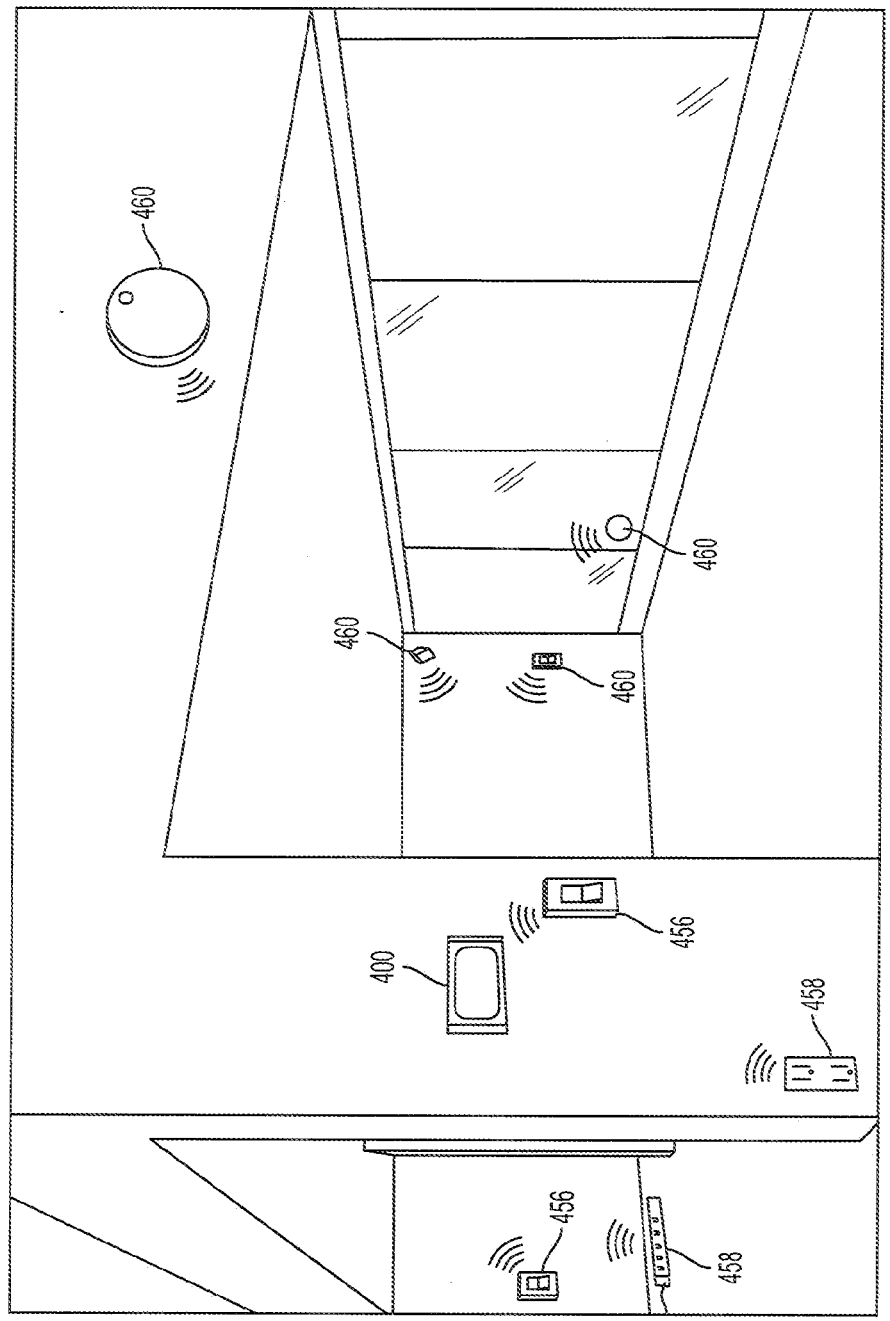
FIG. 4 depicts an example thermostat and messaging device deployed in an example residential environment.

FIG. 4 depicts an example TMD 400 deployed in a residential environment. The TMD 400 can be in wireless communication with a variety of controllable devices, such as switches 456 and outlets 458. The switches 456 can be batteryless and allow for 3-way and 4-way control without the burden of running conventional wiring between wall switches. The TMD 400 can also facilitate scene-based control and other home automation functionality. By controlling outlets 458, including power strips, the TMD 400 can control plug loads in areas of the environment that are unoccupied. In some embodiments, the outlets 458 can respond to RF transmitters to switch a relay on and off. The TMD 400 can also wirelessly receive information from a variety of sensors 460, such as occupancy sensors, window sensors, and lighting sensors. The TMD 400 can determine environmental conditions to intelligently control an HVAC system.

Figure 5:
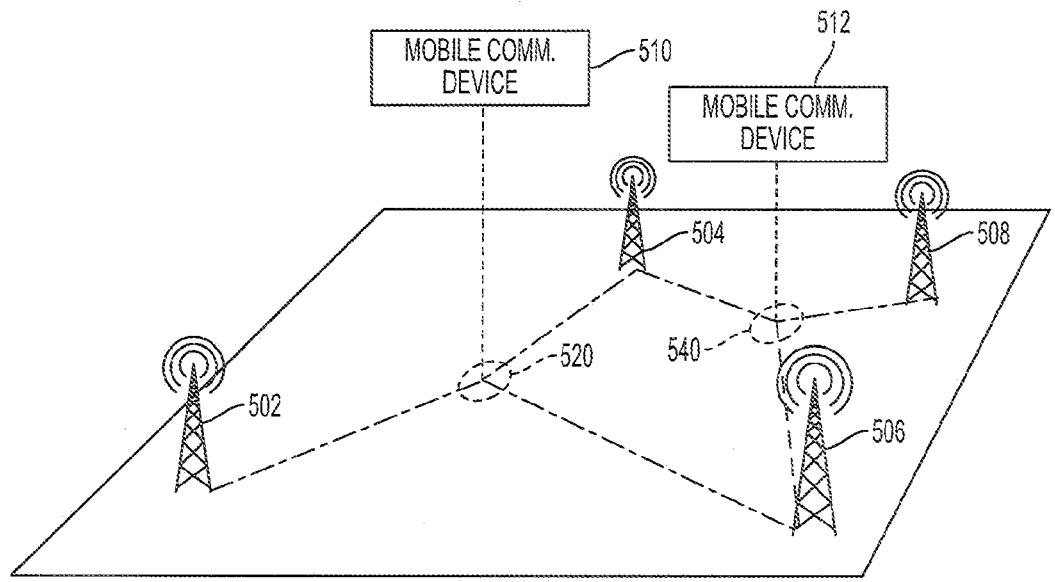
FIGS. 5-6 schematically depict mobile communication devices being geo-located subsequent to initiating an emergency call.
Figure 6:
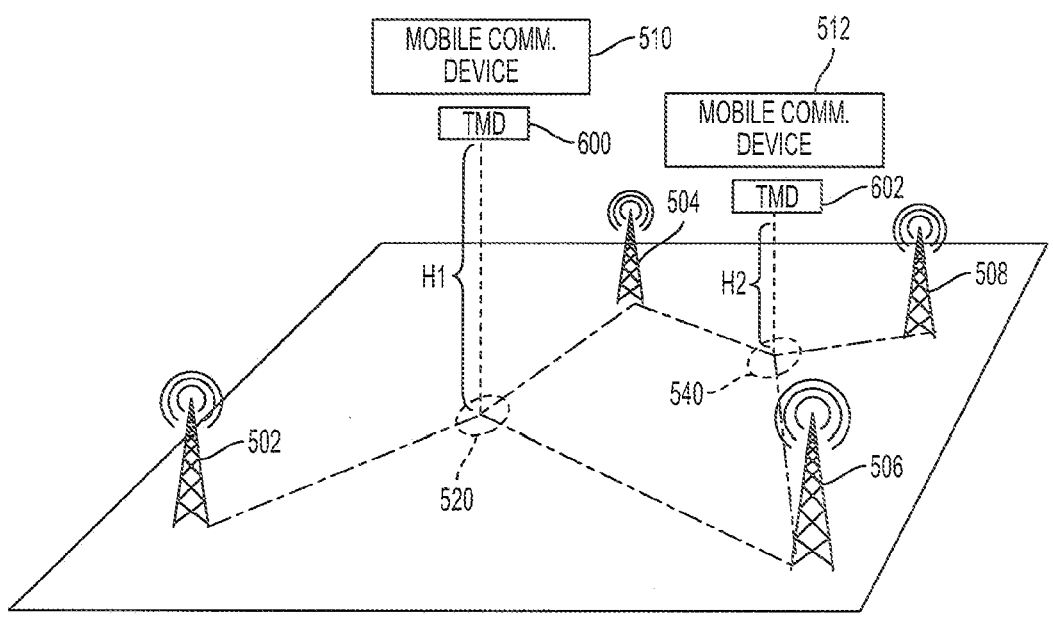

FIGS. 5-6 schematically depict mobile communication devices 510, 512 being geo-located subsequent to initiating an emergency call. Referring first to FIG. 5, the mobile communication devices 510, 512 are shown being geo-located using conventional techniques. As schematically shown, when determining the location of the mobile communication device for use by emergency responders, the determined location of the mobile communication device is limited to a particular area on a horizontal axis. Using signaling information from mobile communication towers 502, 504, 506, the mobile communication device 510 can be determined to be located in the area 520. Similarly, using signaling information from mobile communication towers 504, 506, 508, the mobile communication device 512 can be determined to be located in the area 540. Notably, while the areas 520, 540 can be identified using triangulation techniques, the altitude (i.e., height in the vertical axis) of the mobile communication devices 510, 512 is not known to an emergency responder. Therefore, if the user of a mobile communication 510 is within a multi-unit structure (such as a hotel, apartment, dormitory, office building, etc.) the area 520 determined by conventional triangulation techniques may not provide an emergency responder enough information to quickly locate a caller. Thus, in densely populated areas conventional triangulation techniques may not provide sufficient locational information to an emergency responder.

FIG. 6 depicts the use of TMDs 600, 602 to address the deficiencies of conventional geo-location techniques by augmenting the information provided to emergency responder. Accordingly, the TMDs 600, 602 can be configured such that when a caller makes an emergency call the TMDs 600, 602 can provide supplemental information (such as height, altitude, address, GPS coordinates, etc.) to any number of devices or recipients, such as the caller's phone, an emergency communication center, and so forth.

In one embodiment, for example, upon placing an emergency call (i.e, calling 9-1-1 or executing an emergency response request through a mobile app or other technique), the mobile communication device 510 can ping the nearest TMD (i.e., TMD 600) to received geolocation information stored by the TMD. The geolocation information received from the TMD can be, for example, a vertical height, an address (i.e. "apartment 17B"), GPS coordinates, etc. This geolocation information can be unique to each TMD, or collection of TMDs within a particular sub-environment, and entered into the TMD at the time of installation or during times of configuration. In any event, upon receiving the geolocation information from the TMD, the mobile communication device 510 can relay the information to proper recipient such that the location of the call can be provided to emergency responders. Therefore, as shown in FIG. 6, the particular location of the mobile communication devices 510, 512 can include height, shown as height H1 for TMD 600 and height H2 for TMD 602.

In some embodiments, the TMDs 600, 602 can include a user activated element to request emergency services (fire, police, medical, etc.). Such user activated element can be an icon, switch, button, etc. Activation of such element can cause the TMD to send a request for emergency services through any suitable communication channel provided by the TMD, such as cellular, VoIP, Internet, and so forth. In this request, the geolocation information of the requesting TMD can be included, such as the emergency responders can have a precise location of the person in need of emergency services.

Furthermore, in some embodiments, the TMDs 600, 602 can maintain an emergency contact list or other distribution list. Upon the transmission of a request for emergency services, the TMD can automatically transmit a notification to persons on the emergency contact or distribution list using various communication techniques (emails, text messages, automated voice messaging, multimedia messages, social media messaging, and so forth). The determination that emergency services has been requested can be made based on, for example, a mobile communication device requesting the geolocation information TMD or a user activating the user activated element.

Figure 7A:
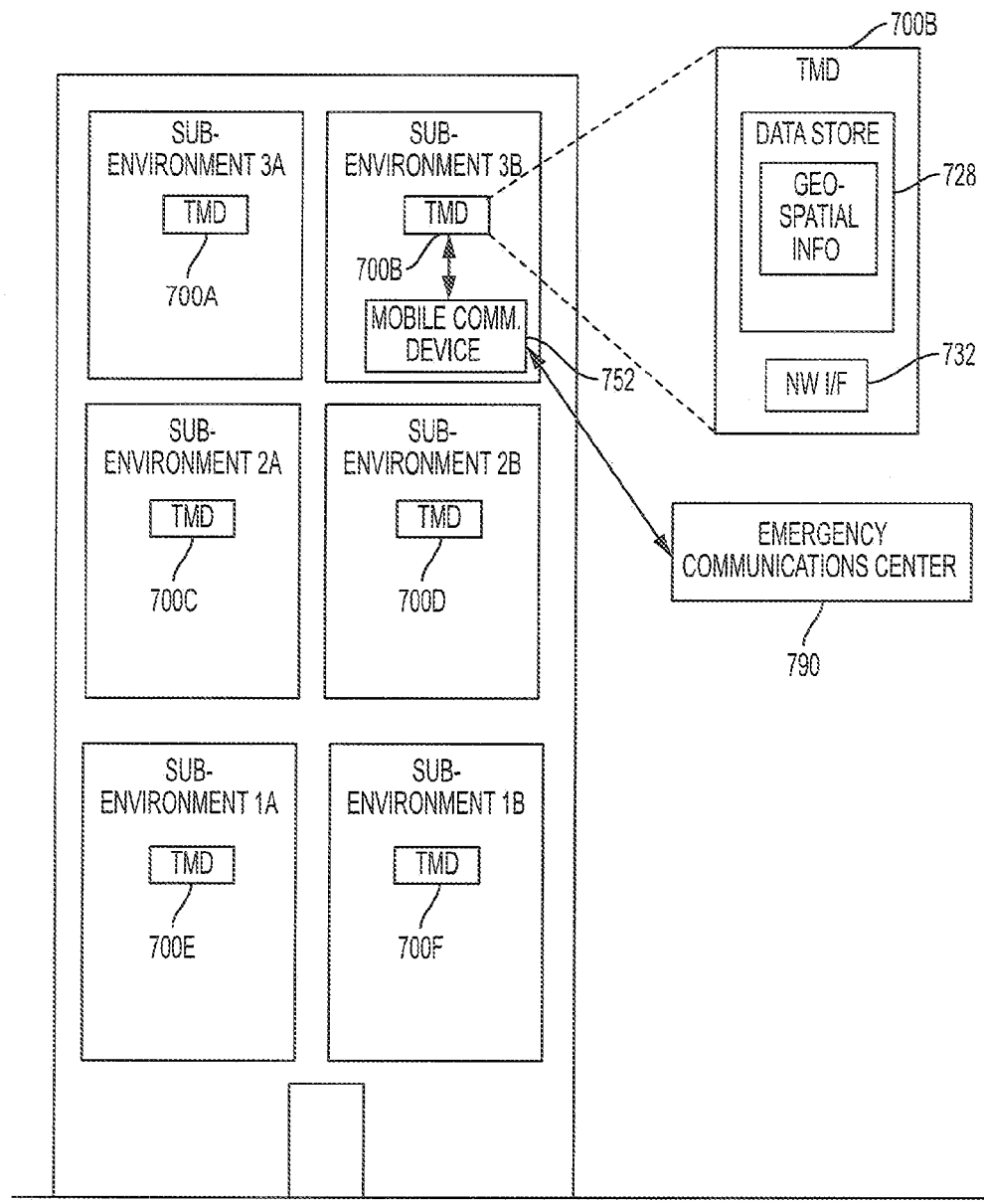
FIGS. 7A-7C schematically depict a plurality of thermostat and messaging devices positioned throughout a structure.
Figure 7B:
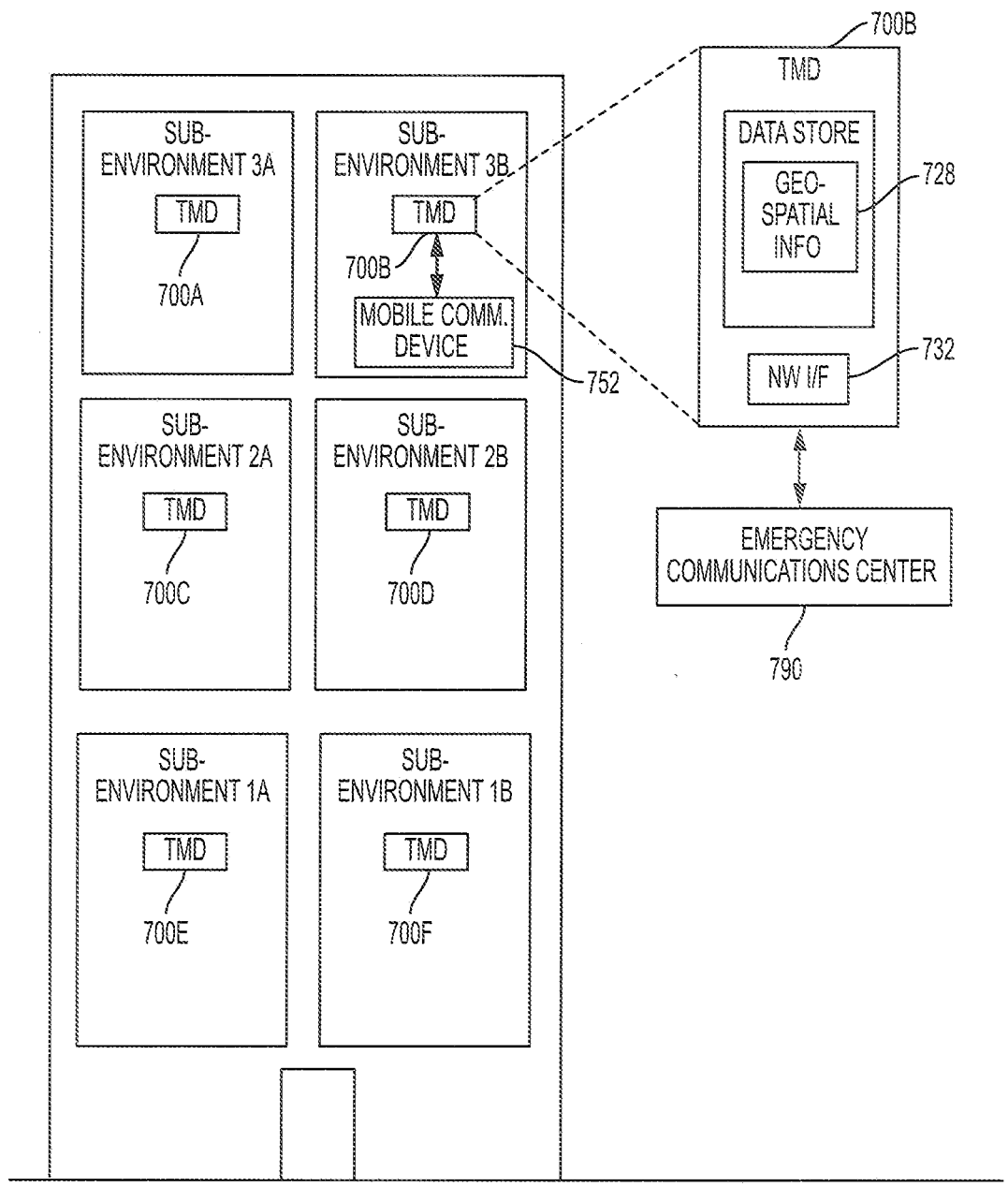

FIG. 7A schematically depicts a plurality of TMDs 700A-700F positioned throughout a structure. The structure can be, for example, an office building, a dormitory, an apartment building, or a hotel. The structure can have a plurality of floors such that conventional triangulation techniques may not necessarily provide sufficient granularity for an emergency responder to identify a location of a caller within the structure. The structure can have a plurality of sub-environments, which can be, for example, hotel rooms, apartments, dorm rooms, and the like. Referring to sub-environment 3B, the TMD 700B positioned with in the sub-environment can store geospatial information 728 relative to that particular TMD. The geospatial information 728 can be stored in, for example, data store 128 (FIG. 1). The geospatial information 728 can be, for example, an address, a height, a building locational code, GPS coordinates, or any other suitable geospatial-related data. As shown, an occupant can initiate a call to an emergency communications center 790 using a mobile communications device 752. The mobile communications device 752 can also communicate with the TMD 700B via the network interface 732 to retrieve the geospatial information 728 stored by the TMD 700B. Upon receipt of the information, the mobile communications device 752 can provide the geospatial information 728 to the emergency communications center 790 through its networked connectivity. In other embodiments, as shown in FIG. 7B, instead of the mobile communications device 752 providing the geospatial information 728, the TMD 700B can relay this information to the emergency communications center 790. Thus, when the TMD 700B determines an emergency call has been placed, or upon a request by the mobile communications device 752, the TMD 700B can provide the geospatial information 728 to the emergency communication center 790. As is to be appreciated, the emergency communication center 790 can be any suitable centralized emergency dispatch or monitoring service.

Figure 7C:
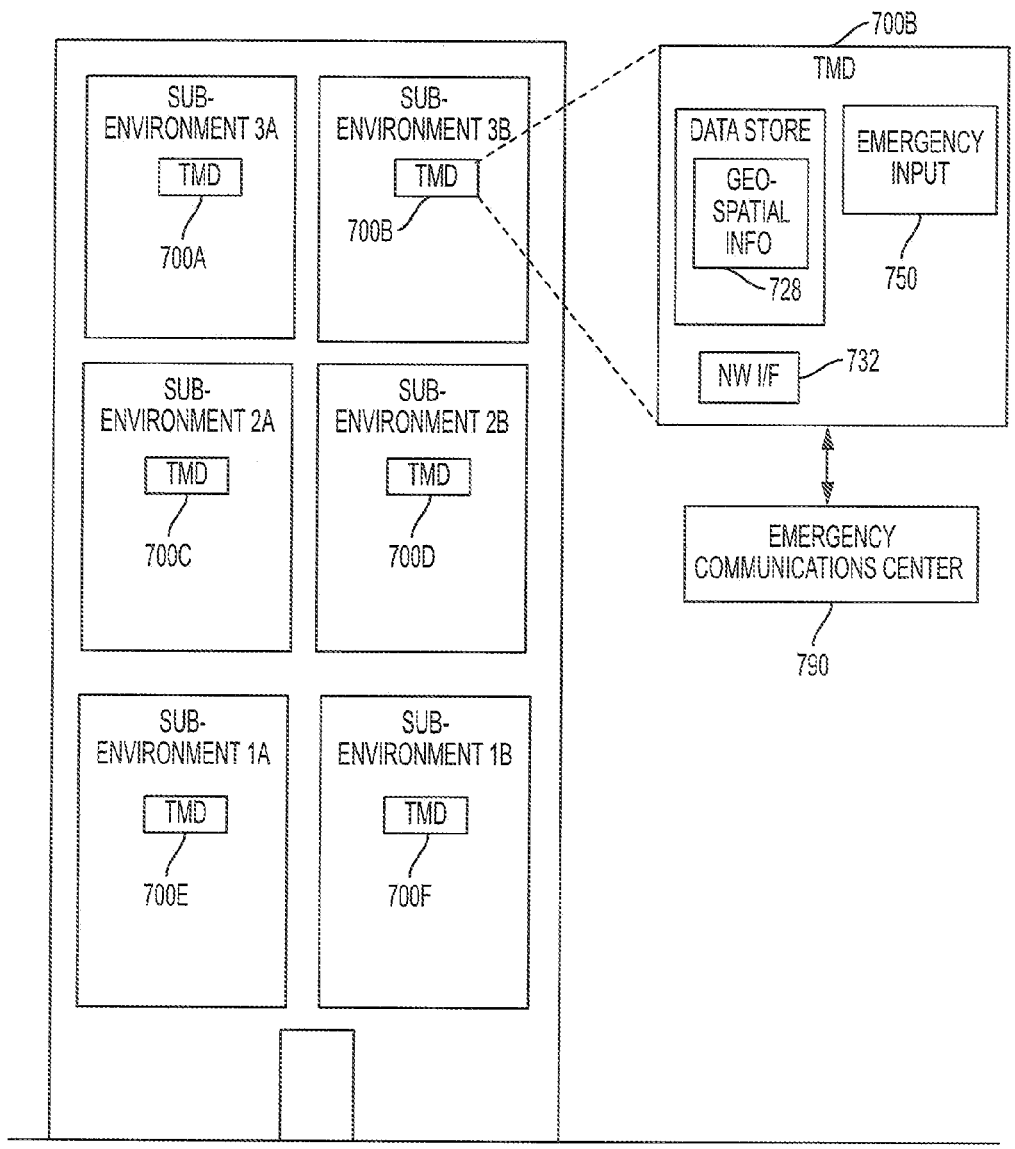

Referring now to FIG. 7C, in some embodiments, instead of initiating the emergency call using the mobile communications device 752, the occupant can interact with the TMD 700B and request the desired type of emergency responders (fire, police, medical, etc.) through an emergency input 750. The TMD 700B can then communicate with the emergency communications center 790 through the network interface 732 to convey the request. Included in the communication can be the geospatial information 728. Furthermore, the request can also include additional information, such as occupant information, medical information, and so forth.

The systems and methods described herein are not limited to any particular networking topology. FIGS. 8A-8B, for example, depict example communication diagrams according to various implementations. As shown in FIG. 8A, in one embodiment, a TMD 800 can communicate with a local access point 836. The local access point 836 can communicate with off-site servers and computers 838 via an Internet connection 834. By comparison, FIG. 8B depicts the TMD 100 communicating directly with off-site servers and computers 838 through the Internet connection 834.

Figure 9:
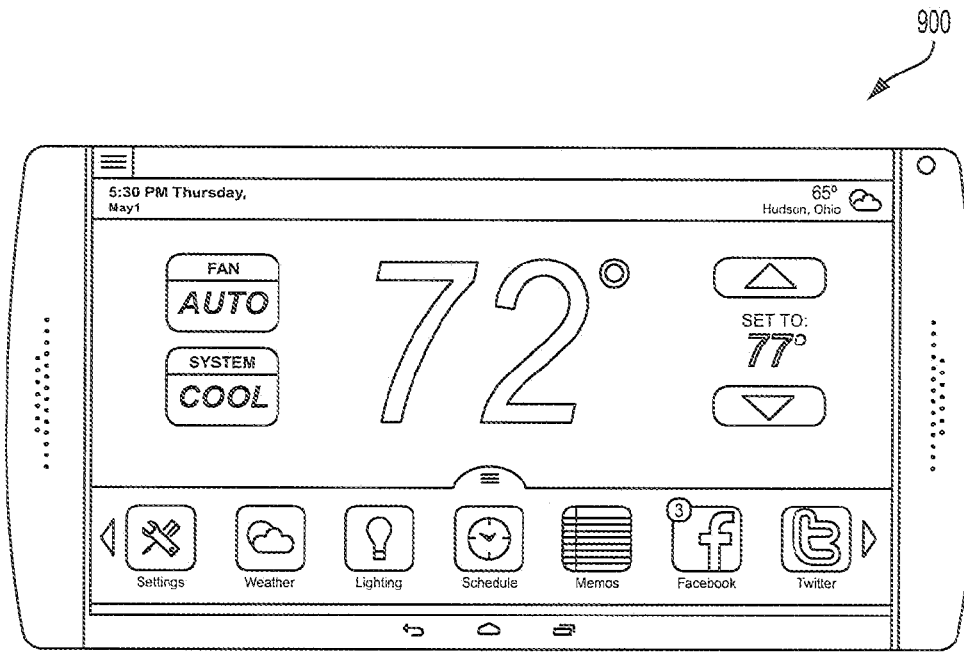
FIGS. 9-10 depict non-limiting example interfaces of various thermostat and messaging devices.
Figure 10:
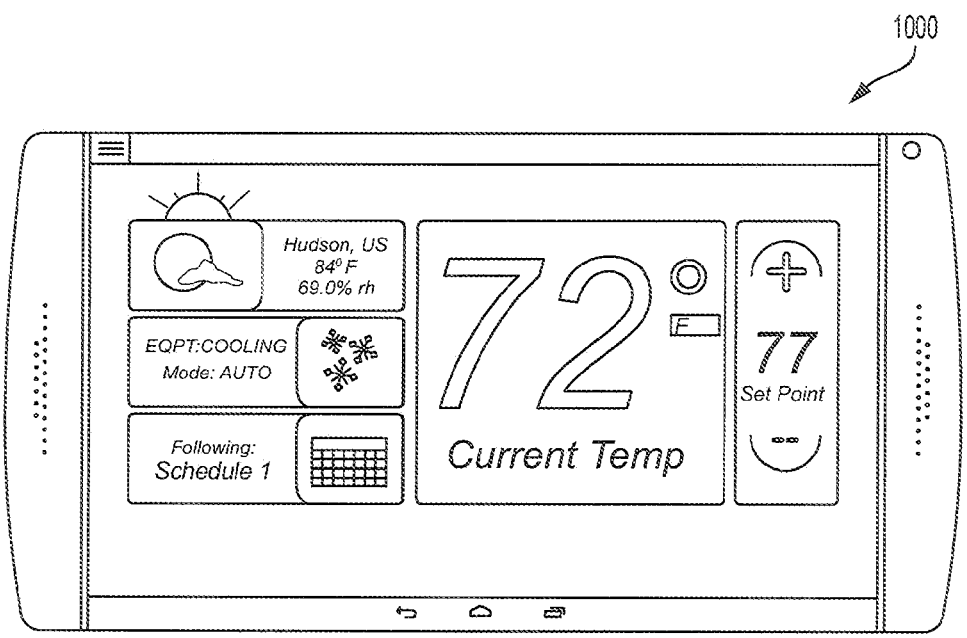

FIGS. 9-10 depict non-limiting example interfaces of various TMDs. As shown, in TMDs 900, 1000, the user interface can include HVAC control elements, as well as a variety of other icons, menus, graphics, and displays. In some embodiments, the TMD can include a camera to facilitate video chatting and/or video messaging.

Figure 11:
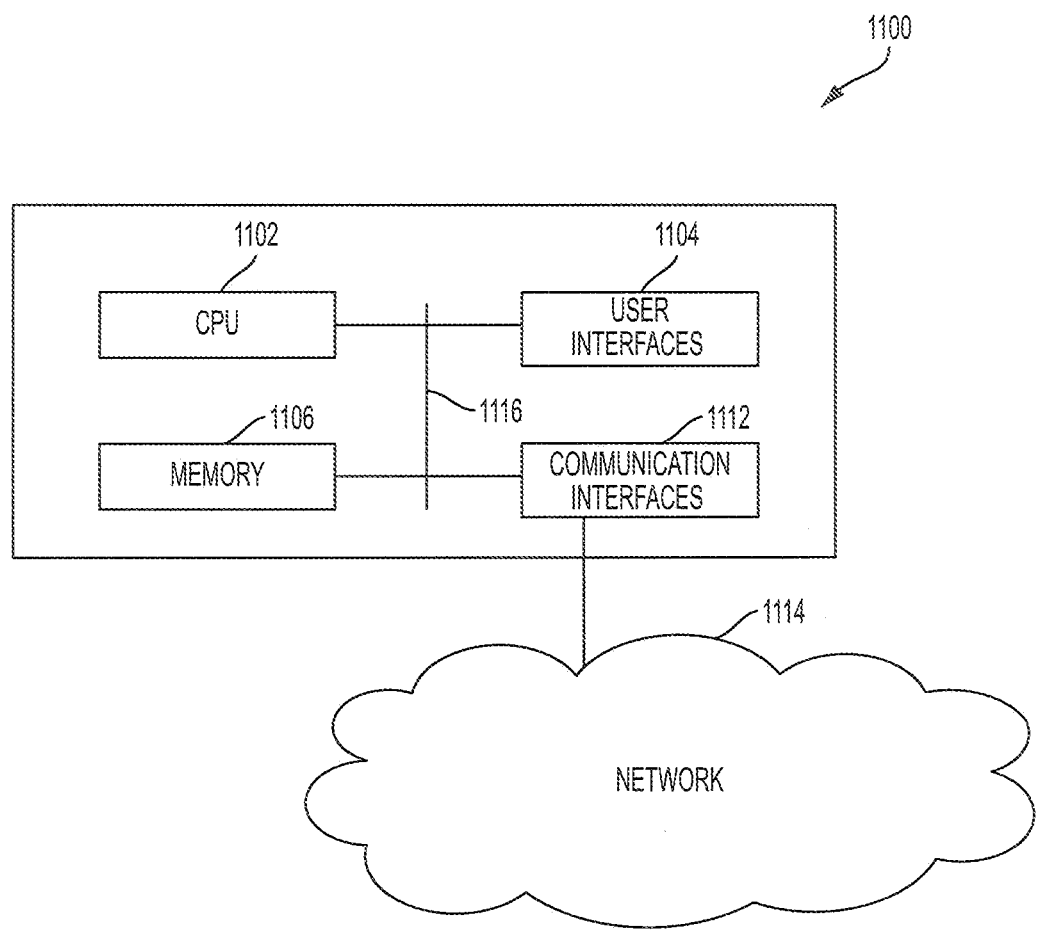
FIG. 11 depicts an example computing device.

The processes described herein can be performed on or between one or more computing devices. Referring now to FIG. 11, an example computing device 1100 is presented. A computing device 1100 can be a server, a computing device that is integrated with other systems or subsystems, a mobile computing device, a cloud-based computing capability, and so forth. The computing device 1100 can be any suitable computing device as would be understood in the art, including without limitation, a custom chip, an embedded processing device, a tablet computing device, a personal data assistant (PDA), a desktop, a laptop, a microcomputer, a minicomputer, a server, a mainframe, a TMD 100, 200, 300A-C, 400, 600, 602, 700A-F, 800 computing device 138, mobile computing device 252, 352, the environment control system 370, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 1100 includes a processor 1102 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 1100 also includes one or more memories 1106, for example read only memory (ROM), random access memory (RAM), cache memory associated with the processor 1102, or other memories such as dynamic RAM (DRAM), static ram (SRAM), programmable ROM (PROM), electrically erasable PROM (EEPROM), flash memory, a removable memory card or disk, a solid state drive, and so forth. The computing device 1100 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 1102, or memories 1106 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 1112 can be configured to transmit to, or receive data from, other computing devices 1100 across a network 1114. The network and communication interfaces 1112 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 1112 can include wired data transmission links such as Ethernet and TCP/IP. The communication interfaces 1112 can include wireless protocols for interfacing with private or public networks 1114. For example, the network and communication interfaces 1112 and protocols can include interfaces for communicating with private wireless networks such as a WiFi network, one of the IEEE 802.10x family of networks, or another suitable wireless network. The network and communication interfaces 1112 can include interfaces and protocols for communicating with public wireless networks 1112, using for example wireless protocols used by cellular network providers, including Code Division Multiple Access (CDMA) and Global System for Mobile Communications (GSM). A computing device 1100 can use network and communication interfaces 1112 to communicate with hardware modules such as a database or data store, or one or more servers or other networked computing resources. Data can be encrypted or protected from unauthorized access.

In various configurations, the computing device 1100 can include a system bus 1116 for interconnecting the various components of the computing device 1100, or the computing device 1100 can be integrated into one or more chips such as programmable logic device or application specific integrated circuit (ASIC). The system bus 1116 can include a memory controller, a local bus, or a peripheral bus for supporting input and output devices 1104, and communication interfaces 1112. Example input and output devices 1104 include keyboards, keypads, gesture or graphical input devices, motion input devices, touchscreen interfaces, one or more displays, audio units, voice recognition units, vibratory devices, computer mice, and any other suitable user interface.

The processor 1102 and memory 1106 can include non-volatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein. Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. A thermostat and messaging device for an environment having a climate control system, comprising:
   a user interface including a display screen;
   a data store, wherein geospatial information of the thermostat and messaging device is stored in the data store; and
   a controller coupled to the user interface, wherein the controller is to:
   (i) generate control signals to one or more components of a climate control system of an environment,
   (ii) receive, from a mobile communication device, a request for the geospatial information subsequent to initiation of an emergency call from the mobile communication device, and
   (iii) transmit the requested geospatial information to the mobile communication device for relay to an emergency communications center.

2. The thermostat and messaging device of claim 1, wherein the geospatial information is any of a height, an address, and a positional identifier of the thermostat and messaging device.

3. The thermostat and messaging device of claim 1, wherein a distribution list is stored in the data store.

4. The thermostat and messaging device of claim 3, wherein the controller is to transmit messaging to a recipient on the distribution list based on detection of an emergency event.

5. The thermostat and messaging device of claim 4 wherein the emergency event is detected when the geospatial information is transmitted to the mobile communication device.

6. The thermostat and messaging device of claim 1, wherein the geospatial information comprises height data corresponding to the thermostat and messaging device; and
   wherein to transmit the requested geospatial information comprises to transmit the height data to the mobile communication device for relay to the emergency communications center as supplemental location information corresponding to a location of the mobile communication device when the emergency call is initiated.

* * * * *